US011727415B2

(12) United States Patent
Hoffman et al.

(10) Patent No.: US 11,727,415 B2
(45) Date of Patent: Aug. 15, 2023

(54) SYSTEM FOR THE MERCHANDISING AND DELIVERY OF CUSTOMIZED INFORMATION RELATED TO A SPECIFIC PRODUCT OF INTEREST TO A CONSUMER

(71) Applicant: Avery Dennison Retail Information Services LLC, Mentor, OH (US)

(72) Inventors: George Hoffman, Kernersville, NC (US); Jeffrey P. Jooste, Gig Harbour, WA (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 100 days.

(21) Appl. No.: 16/218,968

(22) Filed: Dec. 13, 2018

(65) Prior Publication Data
US 2020/0193455 A1 Jun. 18, 2020

Related U.S. Application Data

(62) Division of application No. 13/511,248, filed as application No. PCT/US2010/060658 on Dec. 16, 2010, now Pat. No. 10,169,796.
(Continued)

(51) Int. Cl.
*G06Q 30/00* (2023.01)
*G06Q 30/0201* (2023.01)
(Continued)

(52) U.S. Cl.
CPC ..... *G06Q 30/0201* (2013.01); *G06K 7/10445* (2013.01); *G06K 7/1417* (2013.01); *G06Q 30/0229* (2013.01); *G06Q 30/0631* (2013.01)

(58) Field of Classification Search
CPC . G06Q 30/0601–0643; G06Q 30/0201; G06Q 30/0229; G06Q 30/0631; G06K 7/10445; G06K 7/1417
(Continued)

(56) References Cited

U.S. PATENT DOCUMENTS 6,199,048 B1  3/2001  Hudetz et al.
7,065,559 B1*  6/2006  Weiss ............... H04L 65/1101
                                          709/219
(Continued)

FOREIGN PATENT DOCUMENTS

CN      1388702       1/2003
CN      1625744       6/2005
(Continued)

OTHER PUBLICATIONS

Sirkanungo, R. (2009). Information management system using two-dimensional barcodes and cell phone technology (Order No. 1468132). Available from ProQuest Dissertations & Theses Global. (304906535). (Year: 2009).*
(Continued)

*Primary Examiner* — Arielle E Weiner

(57) ABSTRACT

A system and method is provided for delivering customized information related to a specific product of interest to consumer. In practice, the consumer uses a suitably enabled portable, mobile and/or wireless device (e.g., such as a mobile camera phone) to scan or otherwise read a marker associated with a product, retail item or other article of interest. From the marker, a unique ID is obtained (i.e., the marker ID). The marker ID is then used to cross-reference a URL or other like address in a database that relates marker IDs to corresponding URLs. The target URL is returned to the consumer's device and an http session is established with a content management server at the target URL. In one suitable embodiment, the content management server obtains a SKU and/or template web page ID that are associated with the marker ID in a database. Suitably, the SKU relates to the specific product with which the marker was associated. Having in this way determined the actual specific product of interest to the consumer, customized information related thereto can be delivered to the consum-
(Continued)

er's device, e.g., via a web page optimized for the identified device. Optionally, the web page content and/or template is obtained from a database that associates the same with the template web page ID received by the content management server.

4 Claims, 1 Drawing Sheet

Related U.S. Application Data

(60) Provisional application No. 61/291,092, filed on Dec. 30, 2009.

(51) Int. Cl.
*G06Q 30/0226* (2023.01)
*G06K 7/10* (2006.01)
*G06K 7/14* (2006.01)
*G06Q 30/0601* (2023.01)

(58) Field of Classification Search
USPC .................................................. 705/26.62
See application file for complete search history.

(56) References Cited

U.S. PATENT DOCUMENTS

| | | |
|---|---|---|
| 2001/0051915 A1 | 12/2001 | Ueno et al. |
| 2002/0095441 A1* | 7/2002 | Lakhani ............ G06Q 30/0601 |
| | | 705/26.1 |
| 2002/0134830 A1* | 9/2002 | Golub ................... G06Q 30/06 |
| | | 235/375 |
| 2003/0028451 A1 | 2/2003 | Ananian |
| 2003/0097639 A1 | 5/2003 | Niyogi et al. |
| 2003/0120745 A1 | 6/2003 | Katagishi et al. |
| 2003/0178485 A1 | 9/2003 | Lee |
| 2005/0198095 A1 | 9/2005 | Du et al. |
| 2006/0011716 A1* | 1/2006 | Perkowski ............. G06Q 30/02 |
| | | 235/375 |
| 2006/0111967 A1 | 5/2006 | Forbes |
| 2008/0120129 A1* | 5/2008 | Seubert .................. G06Q 10/10 |
| | | 705/35 |
| 2009/0163363 A1 | 6/2009 | Moreland et al. |
| 2009/0307232 A1* | 12/2009 | Hall .................... G06F 16/9554 |
| 2010/0191578 A1* | 7/2010 | Tran ................... G06Q 30/0217 |
| | | 705/26.7 |

FOREIGN PATENT DOCUMENTS

| | | |
|---|---|---|
| CN | 1645400 | 7/2005 |
| CN | 101127114 | 2/2008 |
| WO | 200065509 | 11/2000 |
| WO | 03/090145 | 10/2003 |

OTHER PUBLICATIONS

Ref U Continued: Retrieved from https://www.proquest.com/dissertations-theses/information-management-system-using-two/docview/304906535/se-2 (Year: 2009).*

Al-Khalifa, Hend S.; "Computers Helping People with Special Needs: 11th International Conference, ICCHP 2008, Linz, Austria, Jul. 9-11, 2008. Proceedings"; pp. 1065-1069; Print ISBN: 978-3-540-70539-0; Online ISBN: 978-3-540-70540-6.

International Search Report and Written Opinion dated Jul. 18, 2011 for International Application No. PCT/US2010/60658 filed Dec. 16, 2010.

Extended European Search Report dated Oct. 10, 2014 for European Application No. 10799192.9.

International Preliminary Report on Patentability dated Jul. 4, 2012 issued in corresponding IA No. PCT/US2010/060658 filed Dec. 16, 2010.

* cited by examiner

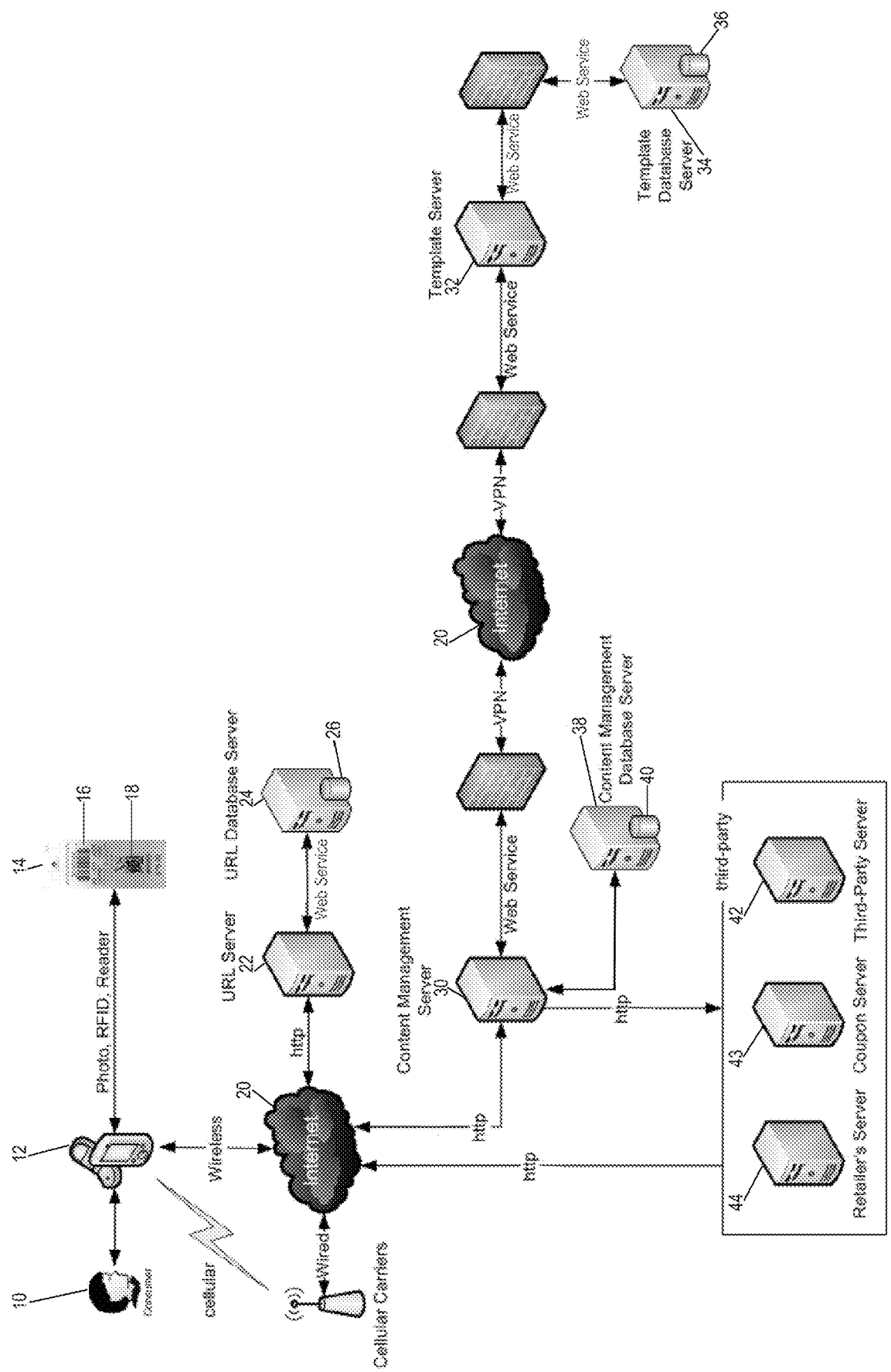

SYSTEM FOR THE MERCHANDISING AND DELIVERY OF CUSTOMIZED INFORMATION RELATED TO A SPECIFIC PRODUCT OF INTEREST TO A CONSUMER

CROSS-REFERENCE TO RELATED APPLICATIONS

The present application claims priority from and the benefit of U.S. Utility application Ser. No. 13/511,248 filed May 22, 2012, International Application No. PCT/US2010/060658 filed Dec. 16, 2010, and U.S. Provisional Patent Application No. 61/291,092 filed Dec. 30, 2009, each of which is incorporation herein by reference in its entirety.

FIELD OF THE INVENTION

The present invention is in the field of intelligent applications that are directed to improving the consumer retail experience and brand optimization. More particularly, a unique identifier, such as a numerical reference is provided on a tag or brand identification device that enables a consumer to obtain additional product information related to such consumer article.

BACKGROUND OF THE INVENTION

The present inventive subject matter relates generally to the information technology arts and wireless communication. Particular relevance is found in connection with a system and/or process for providing selected marketing, consumer and/or other information of interest to a wireless and/or handheld device which captures and/or reads barcodes or other like indicia included on tags, labels, packaging, etc. attached to or otherwise associated with consumer products or other articles. Accordingly, the present specification makes specific reference thereto. However, it is to be appreciated that aspects of the present inventive subject matter are also equally amenable to other like applications.

Customer loyalty programs are generally well known and typically associate a membership number or other identifier with a consumer. Goods or articles purchased by the consumer are then registered as shopping preferences of the particular consumer so that the retailer can then select possible items of interest that may be related to some of the shopping preferences, in order to send to the consumer via the membership number.

In addition, couponing systems are known in which when a particular item is purchased; a coupon or other associated product discount or promotion may be generated at the point of sale in order to solicit future purchases of additional product or a related items.

What is needed therefore is a real time, proactive system which allows a consumer to potentially experience potential products without the necessity of having to first make a purchase in order to learn of the existence of the related items.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In one exemplary embodiment of the present invention, a system for delivering product specific information is provided. The system includes a first database including a collection of product information. The system further includes at least one consumer good to which has been provided a tag or brand identification device having a unique identifier. A personal data collection device which can read and transmit the unique identifier to the data base. A computer which can receive the data from the personal data collection device, interpret the unique identifier and transmit related product information to the personal data collection device. A user interface provided on the personal data collection device to allow the user to select at least one product from the collection of product information.

In a further exemplary embodiment of the presently described invention, a process for obtaining product specific information is described and includes the steps of initially providing a data base that has a collection of product information. Then applying a brand identification device to a consumer good, the brand identification device has a unique identifier. Next, a personal data collection device is provided which can read and transmit the unique identifier to the data base. Data is received from the personal data collection device on a computer. The data is interpreted from the personal data collection device. Related product information is transmitted to the personal data collection device. A user interface is provided on the personal data collection device. One of the collection of product information is selected using the product interface on the personal data collection device.

The marker can be provided in a physical arrangement, such as an apparel hang tag, label or the like or alternatively, may be made available to the consumer in a virtual arrangement, such as may be depicted on a computer or video screen. In the alternative, the image would need to have a sufficiently high resolution in order to be able to read the information on the label or tag. Where the information is a virtual display or advertisement, the information could be encoded into a RFID device and either built into the advertising unit or attached to the unit as a label or tag.

In a still further exemplary embodiment of the presently described invention, a merchandising system is described and includes a consumer good that has a brand identification device associated therewith. The brand identification device includes information that is one of encoded or printed. The system also includes a personal data collection device, the personal data collection device is configured to read or decode the information contained on the brand identification device and the personal data device transmits the information to a computer data base.

Continuing with a discussion of the foregoing merchandizing system, the computer data base contains details of associated goods or services related to the information received from the personal data collection device. The computer data base provides the details of the associated goods or services to the personal data device. The system also includes a retail service location to permit a consumer to purchase one or more details related to the information from the consumer good.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The inventive subject matter disclosed herein may take form in various components and arrangements of components, and in various steps and arrangements of steps. The drawings are only for purposes of illustrating preferred embodiments and are not to be construed as limiting. Further, it is to be appreciated that the drawings may not be to scale.

FIG. 1 shows an exemplary architecture and/or workflow for obtaining customized information related to a specific product of interest to a consumer in accordance with aspects of the present inventive subject matter.

DETAILED DESCRIPTION OF THE EMBODIMENTS

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

With reference now to the FIGURE, there is illustrated an exemplary architecture system and/or workflow in accordance with aspects of the present inventive subject matter. Suitably, in a first step, a consumer 10 or other like user launches a suitable application or software (hereinafter nominally referred to as scanning software) supported and/or resident on their portable, handheld and/or mobile device 12, e.g., such as a mobile phone, personal digital assistant (PDA), handheld or laptop computer or any other similar device. More specifically, the aforementioned application or software, i.e., the scanning software, enables the device 12 to capture and/or read selected indicia and decode or decrypt the same or otherwise extract a code therefrom.

In practice, the consumer 10 uses the scanning software and/or device 12 (e.g., in a store or other retail environment) to selectively scan, read, image and/or photograph a particular marker or indicia assigned to, designated for and/or associated with the retail product, article or other item of interest to the consumer 10. As shown in the illustrated embodiment, the marker or indicia is printed, encoded or otherwise arranged on a tag or label 14 that is affixed or otherwise attached to or associated with the retail product or other article of interest to the consumer 10. Alternately, the marker may be arranged directly on the article of interest itself, such as through a woven fabric label that is attached to a garment, or on other packaging or the like which is attached to or otherwise associated with the article of interest. Suitably, the marker may be for example a retail barcode 16 or a 2D (two-dimensional) barcode 18 (e.g., as shown in the illustrated embodiment), or alternately, it may be a product picture or other image or any other identifying symbol or indicia assigned to, designated for and/or associated with the retail product, article or other item of interest. Optionally, the marker may be an electronic marker or signal, e.g., such as the type output from an RFID (Radio Frequency IDentification) tag or the like. The RFID device may be provided as an inlay, which is then inserted into an apparel tag or ticket. Exemplary RFID devices are available from Avery Dennison RFID Company of Mentor, Ohio.

In an exemplary embodiment, each marker has been printed with or is encoded with or otherwise contains a unique identifier (nominally referred to herein as the marker ID) which is extractable therefrom via the software or application running on the device 12. Alternatively, a label containing the marker can be applied to the article of interest after a number of such labels have been printed or otherwise provided with suitable information.

Suitably, the software or application on the device 12 decodes the barcode or symbol and extracts the unique identifier (i.e., the marker ID). For example, the marker ID may be a 13 digit hexadecimal value extracted from a 2D barcode. Of course, optionally, the identifier may not be strictly unique in the sense that it represents a single specific retail or other like item. Rather, optionally, a given identifier may represent a particular class of goods or type of item, e.g., such as all items that are the same product or the same type of product or the same style of product or the same product line or otherwise. Accordingly, the same identifier may be encoded or otherwise included in the markers applied to all such items.

At the next step, the software or application running on the device 12 makes an http (hypertext transfer protocol) request across the Internet 20, which may be accessed via a cellular or other wireless network or any other similarly available communication method, to a backend URL (Uniform Resource Locator) server 22 and passes thereto (e.g., in the header of the http request) the decoded or otherwise extracted marker ID. In response to receipt of the http request, the URL server 22 and/or appropriate software running thereon makes a standard Java call or the like to a corresponding URL database server 24 to find a URL or other like address associated with the marker ID obtained from the marker. Suitably, the URL database server 24 includes and/or otherwise has access to a database (DB) 26, e.g., such as a DB2 type database produced by International Business Machines Corporation (IBM) or another SQL (Structured Query Language) type database. In general, the DB 26 associates a plurality of different marker IDs with corresponding URLs or other like addresses. Suitably, a single URL or other like address corresponding to a content management server 30 is associated in the DB 26 with a plurality of different marker IDs.

Assuming the URL database server 24 recognizes the obtained marker ID as a number or value associated in the DB 26 with the URL or address of the content management server 30, the URL database server 24 accordingly returns that URL or address (i.e., the target URL or address) to the URL server 22. In turn, the URL server 22 and/or the software running thereon makes an http response back to the portable or mobile device 12 and passes thereto the target URL or other address provided by the URL database server 24.

In response to receiving the target URL or other like address, the device 12 or the software running thereon (e.g., the scanning software) then opens a default or other web browser on the portable/mobile device 12 and makes an http post to the target URL. Accordingly, the http post directs the user 10 (i.e., the web browser running on the device 12) to the content management server 30 and the following information is passed in the http header: Marker ID that was obtained from the scanned or otherwise read marker; an identifier specifying the type of barcode or marker used; a numerical or alphanumerical or other suitable user ID (e.g., which may be contained in the device 12 or the scanning software) that identifies the customer 10; a version number of the scanning software used to scan or read the barcode or other marker; and optionally other information that may be available, e.g., such as a date and/or time of the scan, the GPS (Global Positioning System) coordinates of where the scan was performed or the current location of the device 12, the type (i.e., make and/or model) of the device 12 being used to scan the marker, etc.

In turn, the content management server 30 receives the http post and identifies the portable/mobile device 12 being used. The content management server 30 then holds the http session open and makes a separate Java or web service or other like call across a secure VPN (Virtual Private Network) or other similar network connection to a template server 32 and sends to the template server 32 the information received in the http post from the portable/mobile device 12. Suitably, the template server 32 receives the call from the content management server 30 and in response thereto uses a Java or similar call to contact a template database server 34, which includes or otherwise has access to a DB 36, e.g., such as a DB2 or other SQL type database. In an exemplary embodiment, the DB 36 associates particular marker IDs obtained from scanned markers with corresponding SKU (Stock Keeping Unit) numbers or the like. For example, the DB 36 associates the obtained marker ID with the SKU number or the like assigned to the retail item or other article that is tagged or labeled with or otherwise identified by the marker. In this way then, it is known exactly what retail item or other article is of interest to the consumer 10, i.e., insomuch as its corresponding marker has been scanned, imaged or otherwise read by the consumer's portable/mobile device 12 and/or the scanning software running thereon and ultimately the associated SKU number or the like for that retail item or article has been looked-up in and/or otherwise obtained from the DB 36.

According to one optional embodiment, in addition to the SKU or other like data, each marker ID in the DB 36 is also associated with a template web page ID, and in response to the received Java or other similar call from the template server 32, the template database server 34 returns the corresponding template web page ID to the template server 32, which then returns the received template web page ID (e.g., in a Java or web service or other like response) back to the content management server 30.

In response to the template web page ID received from the template server 32, the content management server 30 makes a Java call or the like to a content management database server 38 that includes or has access to a DB 40 that relates template web page IDs to corresponding web page templates. Accordingly, using the template web page ID received from the content management server 30, the content management database server 38 selects the corresponding web page template from the DB 40 and returns the same to the content management server 30.

In turn, the content management server 30 renders the web page template so that it is optimized for the specific portable/mobile device (as identified previously), and creates an appropriate web page for that device in a suitable and/or otherwise supported format, e.g., such as WML (Wireless Mark-up Language), xHTML (Extensible Hypertext Markup Language), cHTML (Compact HTML), XML (Extensible Mark-up Language), JSP (JavaServer Pages), etc. The content manager server 30 then returns to the browser on the portable/mobile device 12, e.g., via an http response, the rendered web page optimized for that specific device. The web browser on the portable/mobile device 12 accordingly displays the optimized web page to the consumer 10.

Notably, in one suitable embodiment, the web page template that is selected is specific to the item scanned (i.e., the retail or other item of interest that is associated with the tag 14 or the like bearing the scanned marker) so that the user 10 sees on their device 12 a web page that is specific for the item they scanned. Suitably, this is not a generic template, but a customized web page (with potentially dynamic content) for the product being scanned by the user 10. In other word, the web page template is generally not a generic template but a specific web page for the product scanned.

In one alternate embodiment, the template web page ID stored in the DB 36 may instead be a URL or other like address for a third party server 42, e.g., such as a coupon server 43 or retail server or the like. Accordingly, in response to the Java or other like call received from the template server 32, the template database server 34 obtains from the DB 36 the URL or other like address of the third party server 42, and in turn returns the same to the template server 32 which then sends it back to the content management server 30. In this case, along with the URL or other like address of the third party server 42, the corresponding SKU number or other like product identifying data from the DB 36 is also included in the data ultimately returned to the content management server 30.

Upon receipt of the URL or other like address of the third party server 42, the content management server 30 executes an http redirect to the third party server 42 and provides, e.g., in the http header, the associated SKU number or other pertinent information that may be used by the third-party server 42 to generate a customized web page for the specific product being scanned by the consumer 10. Suitably, the third party server 42 uses the SKU or other data provided to identify the product and returns the appropriate web page to the browser on the portable/mobile device 12, e.g., via a standard http return call.

As can be appreciated from the present specification, the information or content delivered to the device 12 can be customized for the specific product of interest to the consumer 10 insomuch as the SKU or other like product identifying information is known. For example, such customized information may include a detailed description of the product or its specification, marketing information related to the product, sales and/or promotional information for the product, coupons for the product, advertisements for or information regarding other products compatible with or related to the product of interest, etc. For example, assume a consumer scans a 2D barcode on the tag of a red dress in a retail store, the returned information may include advertisements for other accessories for sale in the retail store that go with the red dress, e.g., such as a matching belt, shoes, handbag, hat, jewelry, etc.

The foregoing system can also be carried out as part of a merchandizing system in which a consumer good is provided with a brand identification device containing information relating to the consumer good. A prospective customer scans the information and the information is transmitted to a computer database. The database contains details relating to items associated with the consumer good and then sends the details on the associated items back to the consumer. The consumer can then make a selection of the details of the associated items from a retail store environment.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate. In particular, suitably, elements 22, 24 and 26 may be implemented via a single server or other like hardware device, or similarly, elements 30 and 32 may be implemented via a single server or the like, or elements 34 and 38 may be implemented via a single server or the like.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A merchandising system, comprising:
   a brand identification device associated with a consumer good, wherein the brand identification device is configured to have a unique identifier associated with a RFID device including information that is at least one of encoded or printed;
   a personal data collection device configured to perform at least one of reading and decoding the information contained on the brand identification device, and to transmit the information and a type identification of the personal data collection device to a URL server;
   a database containing details of associated goods or services related to the information transmitted from the personal data collection device;
   the URL server configured to:
   find an address associated with a content management server;
   make an http request back to the personal data collection device, wherein the http request includes the address associated with the content management server which directs a user of the personal data collection device to the content management server;
   the content management server configured to:
   receive the type identification of the personal data collection device;
   determine, based on the information from the brand identification device, whether to create a web page or to perform a redirect;
   when the determination is to create the web page, creating in response to the received type identification a first web page optimized for the personal data collection device based at least in part on the type identification, the first web page providing the details of the associated goods or services from the database and including dynamic content for the consumer good; and
   when the determination is to perform the redirect, providing the redirect to a third-party server that includes detailed information related to the consumer good that is used by the third-party server to generate a customized second web page based on the detailed information of the associated goods or services from the database.

2. The merchandising system of claim 1, wherein the content management server is further configured to provide the first web page to be received by the personal data collection device.

3. The merchandising system of claim 1, further comprising a retail service location to permit a consumer to purchase the consumer good.

4. The merchandising system of claim 1, wherein the detailed information related to the consumer good relates to other compatible products related to the consumer good of interest, and the detailed information related to the consumer good comprises one or more of marketing information, sales information, promotional information, coupons, and advertisements.

* * * * *